US010394379B2

(12) United States Patent
Sah et al.

(10) Patent No.: US 10,394,379 B2
(45) Date of Patent: Aug. 27, 2019

(54) TOUCH INPUT DEVICE (71) Applicant: HYUNDAI MOTOR COMPANY, Seoul (KR)

(72) Inventors: Sung Jin Sah, Suwon-si (KR); Kwang Myung Oh, Suwon-si (KR); Sung Min Park, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 134 days.

(21) Appl. No.: 15/371,809

(22) Filed: Dec. 7, 2016

(65) Prior Publication Data

US 2017/0220195 A1 Aug. 3, 2017

(30) Foreign Application Priority Data

Jan. 29, 2016 (KR) .......................... 10-2016-0011436

(51) Int. Cl.
G06F 3/041 (2006.01)
G06F 3/0488 (2013.01)
G06F 3/0354 (2013.01)

(52) U.S. Cl.
CPC ........ *G06F 3/0418* (2013.01); *G06F 3/03547* (2013.01); *G06F 3/0414* (2013.01); *G06F 3/04883* (2013.01); *G06F 2203/04105* (2013.01)

(58) Field of Classification Search
CPC ............... G06F 3/03547; G06F 3/0418; G06F 3/04883; G06F 2203/04105
See application file for complete search history.

(56) References Cited

U.S. PATENT DOCUMENTS 5,038,142 A 8/1991 Flower et al.
2002/0175836 A1 11/2002 Roberts
(Continued)

FOREIGN PATENT DOCUMENTS

JP 2015-207092 A 11/2015
KR 10-2003-0088137 A 11/2003
KR 10-2014-0089224 A 7/2014

OTHER PUBLICATIONS

Chris Harrison, "Using Shear as a Supplemental Two-Dimensional Input Channel for Rich Touchscreen Interaction" CHI'12, May 5-10, 2012, Austin, Texas, USA, pp. 1-4.
(Continued)

*Primary Examiner* — Amare Mengistu
*Assistant Examiner* — Jennifer L Zubajlo
(74) *Attorney, Agent, or Firm* — Morgan, Lewis & Bockius LLP (57) ABSTRACT A touch input device includes a first sensor having a first surface to which a touch is input, and a second surface opposing the first surface, and a second sensor connected to the second surface of the first sensor, and spaced apart from the first sensor in a vertical direction, wherein the first sensor measures a first position of the touch input to the first surface, wherein the second sensor measures a force caused by the touch input to the first surface of the first sensor, and calculates a second position by applying the force measured by the second sensor to force and moment equilibrium equations, when a distance between the first position and the second position is greater than or less than a threshold, the touch input to the first surface of the first sensor is determined to be a shear force or a sliding gesture, respectively.

15 Claims, 10 Drawing Sheets (56) References Cited

U.S. PATENT DOCUMENTS

2003/0214485 A1* 11/2003 Roberts .............. G06F 3/0414
                                                      345/173
2012/0105358 A1*  5/2012 Momeyer ........... G06F 3/0414
                                                      345/174
2013/0342501 A1   12/2013 Molne et al.

OTHER PUBLICATIONS

Seongkook Heo, "Indirect Shear Force Estimation for Multi-Point Shear Force Operations", CHI 2013, Apr. 27-May 2, 2013, Paris, France, pp. 1-4.

* cited by examiner

TOUCH INPUT DEVICE

CROSS-REFERENCE TO RELATED APPLICATION

This application claims the benefit of priority to Korean Patent Application No. 10-2016-0011436, filed on Jan. 29, 2016, with the Korean Intellectual Property Office, the disclosure of which is incorporated herein in its entirety by reference.

TECHNICAL FIELD

The present disclosure relates to a touch input device and, more particularly, to a touch input device facilitating shear force generation and shear force sensing to thereby provide improved touch interactions.

BACKGROUND

A touch panel is a user interface that can input user operations simply and intuitively by the user touching a display surface or a designated contact surface with a finger, an electronic pen, or the like. Touch panels are applied to various technical fields related to navigation devices, telematics terminals, personal digital assistants (PDAs), laptop computers, notebook computers, smartphones and others.

Touch panels use a variety of touch sensing technologies including resistive overlay, capacitive overlay, surface acoustic wave (SAW) and infrared beam. Conventional touch sensing technologies may sense touch coordinates, i.e., X-axis and Y-axis coordinates on the flat surface of the panel, and thus, they may be limited to two-dimensional (2D) touch interaction.

In order to overcome the limitations of conventional 2D touch interaction, a force-based touch sensing technology (three-dimensional (3D) touch interaction) that sense the force of a touch using a force sensor together with touch coordinates has been proposed.

Recently, the concept of shear force has been applied to the aforementioned force-based touch sensing technology, and research has actively been conducted to implement improved touch interactions using the shear force.

There are conventional technologies with different methods of sensing shear force, including using an analog joystick, and using a capacitive touch pad and a plurality of force sensors.

The aforementioned conventional shear force sensing technologies will be detailed below.

In a technology using an analog joystick, the analog joystick may be interposed between a display and a touch panel. In this configuration, as shear force is applied to the touch panel, the analog joystick may be displaced, and the displacement of the analog joystick may allow the touch panel to move, and thus, the shear force may be sensed. However, such a conventional technology may increase the thickness of the device and make the overall configuration complex by interposing the analog joystick between the display and the touch panel, and thus, it may be difficult to effectively realize the slimness of a touch input structure.

In a technology using a capacitive touch pad and a plurality of force sensors, the plurality of force sensors may be attached to the bottom surface of the capacitive touch pad. This configuration may sense shear force through an algorithm of distinguishing a difference in drag speed with respect to the recognition of the speed and position of a touch point. However, such a conventional technology may distinguish between a coordinate shift caused by sliding and a coordinate shift caused by shear force on the basis of a simple coordinate shift time, resulting in a high possibility of recognition error.

SUMMARY

The present disclosure has been made to solve the above-mentioned problems occurring in the prior art while advantages achieved by the prior art are maintained intact.

An aspect of the present disclosure provides a touch input device that facilitates shear force generation and shear force sensing to thereby provide richer touch interactions.

According to an aspect of the present disclosure, a touch input device includes: a first sensor having a first surface to which a touch is input, and a second surface opposing the first surface; and a second sensor connected to the second surface of the first sensor for measuring a force caused by the touch input to the first surface, and spaced apart from the first sensor in a vertical direction.

The first sensor may be at least one of a touch panel, a touch pad and a touch screen.

The second sensor may be a force sensor capable of measuring a vertical load caused by the touch input to the first sensor.

The second sensor may be spaced apart from the first sensor through a connecting member in the vertical direction.

The connecting member may be disposed to protrude from the second surface of the first sensor in a downward direction.

The touch input device may further include a base plate spaced apart from the second surface of the first sensor, wherein the second sensor may be disposed above the base plate to be supported by a support member.

The support member may be disposed to protrude from the base plate toward the first sensor.

The connecting member may have a T-shaped structure including a horizontal portion extending in a horizontal direction and a vertical portion extending from a center of the horizontal portion in the vertical direction, wherein the horizontal portion may be connected to the first sensor, and the vertical portion may be connected to the second sensor.

The connecting member may have a reverse L-shaped structure including a horizontal portion extending in a horizontal direction and a vertical portion extending from one end of the horizontal portion in the vertical direction, wherein the horizontal portion may be connected to the first sensor, and the vertical portion may be connected to the second sensor.

The connecting member may have a reverse L-shaped structure including a horizontal portion extending in a horizontal direction and a vertical portion extending from one end of the horizontal portion in the vertical direction, wherein an intersecting portion of the horizontal portion and the vertical portion may be fixed to an edge of the first sensor, and a bottom of the vertical portion may be connected to the second sensor.

The connecting member may have a reverse L-shaped structure including a horizontal portion extending in a horizontal direction and a vertical portion extending from one end of the horizontal portion in the vertical direction, and a protrusion may protrude from the second surface of the first sensor in the downward direction, wherein the horizontal portion may be fixed to the protrusion, and the vertical portion may be connected to the second sensor.

The connecting member may have an L-shaped structure including a vertical portion extending in the vertical direction and a horizontal portion extending from a bottom of the vertical portion in a horizontal direction, wherein an upper portion of the vertical portion may be fixed to an edge of the first sensor, and a bottom of the horizontal portion may be connected to the second sensor.

The second sensor may be a strain gauge measuring a force as the strain gauge is subjected to bending by the touch input to the first sensor.

The second sensor may be connected to the second surface of the first sensor through an elastic member.

The elastic member may be a cantilever structure connected to the second surface of the first sensor.

One end of the elastic member may be connected to the second surface of the first sensor through a connecting member, and another end of the elastic member may be supported by a support member.

According to another aspect of the present disclosure, a touch input device includes: a first sensor having a first surface to which a touch is input, and a second surface opposing the first surface; and a second sensor measuring an external force caused by the touch, wherein the first sensor and the second sensor may be spaced apart from each other in a vertical direction.

The first sensor may measure a first position which is an initial touch position of the touch input to the first surface. When a shear force is generated after the touch input to the first position on the first surface, the second sensor may measure the external force and detect a shift from the first position to a second position due to the shear force to calculate the second position.

When the shear force is generated after the touch input to the first position on the first surface, the second sensor may measure a vertical load due to the shear force to calculate the second position.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, exemplary embodiments of the present disclosure will be described in detail with reference to the accompanying drawings. For reference, the dimensions of elements, thicknesses of lines, and the like, illustrated in the drawings referred to in the description of exemplary embodiments of the present disclosure, may be exaggerated for convenience of understanding. Terms used for describing the present disclosed concepts have been defined in consideration of the functions of elements, and may be altered in accordance with the intention of a user or an operator, in view of practice, or the like. Therefore, the terms should be defined on the basis of the entirety of this specification.

Figure 1:
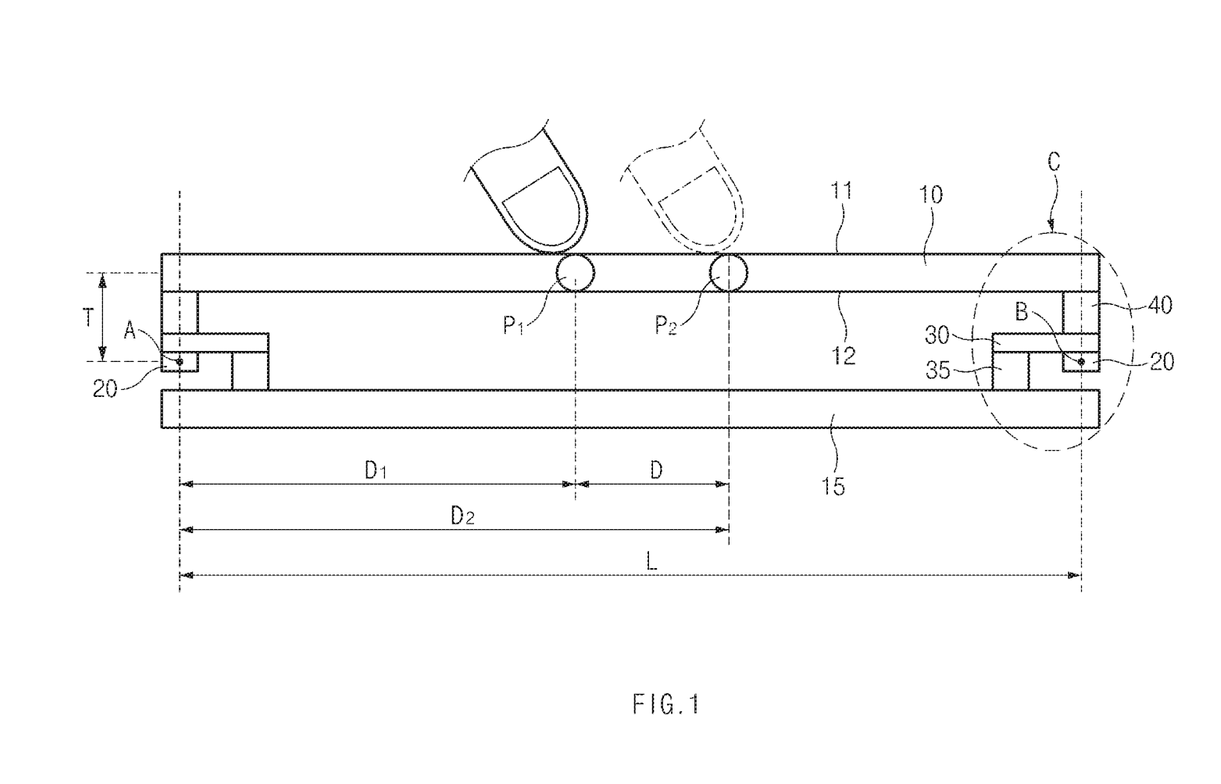
FIG. 1 illustrates a touch input device according to exemplary embodiments of the present disclosure.

FIG. 1 illustrates a touch input device, according to exemplary embodiments of the present disclosure.

Referring to FIG. 1, the touch input device, according to exemplary embodiments, includes a first sensor 10 sensing a touch and a second sensor 20 measuring a force caused by the touch.

The first sensor 10 may have a flat or curved plate structure.

In addition, the first sensor 10 may be at least one of a touch panel, a touch screen, and a touch pad using touch sensing technologies such as resistive overlay, capacitive overlay, surface acoustic wave (SAW), and infrared beam. When a touch is input to a first surface 11 of the first sensor 10, the position of the touch, such as coordinates of the touch, may be measured.

The first sensor 10 may have the first surface 11 to which the touch is input, and a second surface 12 opposing the first surface 11. In FIG. 1, the first surface 11 may be a top surface of the first sensor 10 to which the touch is applied, and the second surface 12 may be a bottom surface of the first sensor 10 opposing the first surface 11.

A base plate 15 may be positioned below the first sensor 10 to be spaced apart therefrom in a vertical direction, and the base plate 15 may be disposed to face the second surface 12 of the first sensor 10.

The second sensor 20 may be connected to the second surface 12 of the first sensor 10, and in particular, the second sensor 20 may be spaced apart from the first sensor 10 by a predetermined gap T in the vertical direction. Here, the vertical gap T may be appropriately adjusted according to specifications of various apparatuses to which the touch input device according to exemplary embodiments of the present disclosure is applied.

Through the structure in which the second sensor 20 is spaced apart from the first sensor 10 by the vertical gap T, shear force may be generated more easily and shear force may be sensed more accurately.

The mechanism for generating and sensing the shear force will be detailed with reference to FIG. 1.

In FIG. 1, the following structure is illustrated by way of example: two second sensors 20 are provided at points A and B below the first sensor 10, respectively.

When a finger of a user or a touch pen touches one point on the first surface 11 of the first sensor 10, the first sensor 10 may measure a first position $P_1$ as an actual touch position at the time of the touch event.

The second sensor 20 may measure the force caused by the touch that is input to the first surface 11 of the first sensor 10. When the touch is input to the first surface 11 of the first sensor 10, if shear force is generated, the position of the touch may be detected to be shifted from the first position $P_1$ to a second position $P_2$ due to the shear force. In other words, as the position of the touch is shifted from the first position $P_1$ to the second position $P_2$ due to the shear force, a distance difference (error) between the first position $P_1$ and the second position $P_2$ may be made.

Here, L is a distance between point A and point B. $D_1$ is a horizontal distance from point A to the first position $P_1$, and $D_1$ may be measured by the first sensor 10. $D_2$ is a horizontal distance from point A to the second position $P_2$, and $D_2$ may be calculated by applying a force (a vertical load) measured by the second sensor 20 to force and moment equilibrium equations. D is a distance difference between the first position $P_1$ and the second position $P_2$.

Meanwhile, the distance $D_2$ with respect to the second position $P_2$ shifted by the shear force may be calculated with reference to FIGS. 14 to 18.

Figure 14:
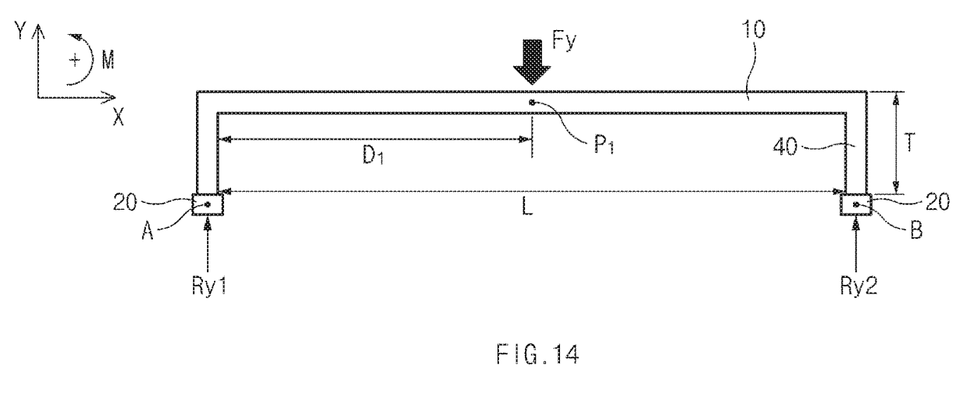
FIG. 14 illustrates a free body diagram showing a relationship of forces acting on a first sensor and a second sensor in a situation in which a vertical load is only applied to a first position according to exemplary embodiments of the present disclosure.

FIG. 14 illustrates a free body diagram showing a relationship of forces acting on the first sensor 10 and the second sensor 20 in a given situation in which a vertical load Fy is only applied to the first position $P_1$.

As illustrated in FIG. 14, when the vertical load Fy is applied to the first position $P_1$, a vertical reaction force Ry1 may act on point A to which one second sensor 20 is fixed, and a vertical reaction force Ry2 may act on point B to which the other second sensor 20 is fixed. The vertical reaction forces Ry1 and Ry2 may be assumed to have positive values on the Y-axis of a coordinate system.

In FIG. 14, an equilibrium equation for the force acting in the vertical direction may be $\Sigma F_Y = Ry1 + Ry2 - Fy = 0$, and the following equation 1 may be derived therefrom:

$$Ry1 = \left(1 - \frac{D_1}{L}\right)Fy \qquad \text{[Equation 1]}$$

In FIG. 14, an equilibrium equation for a moment at point A may be $\Sigma M_A = -D_1 Fy + L Ry2 = 0$, and the following equation 2 may be derived therefrom:

$$Ry2 = \frac{D_1}{L}Fy \qquad \text{[Equation 2]}$$

FIGS. 15 to 18 illustrate free body diagrams showing an equilibrium relationship of forces acting on the first sensor 10 and the second sensor 20 in a given situation in which shear force is initially generated in the first sensor 10.

Figure 15:
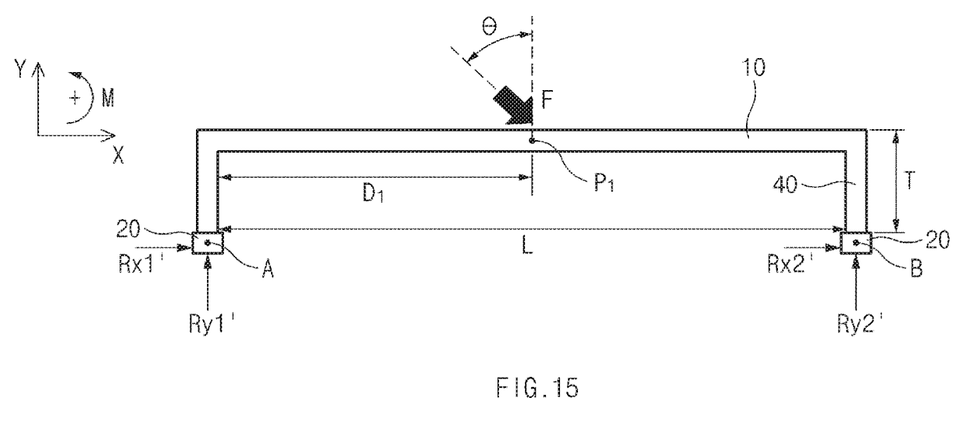
FIG. 15 illustrates a free body diagram in which force enough to generate shear force is applied at an inclined angle with respect to a vertical line according to exemplary embodiments of the present disclosure.

FIG. 15 illustrates a free body diagram in which force F enough to generate shear force is applied at an inclined angle θ with respect to a vertical line.

Figure 16:
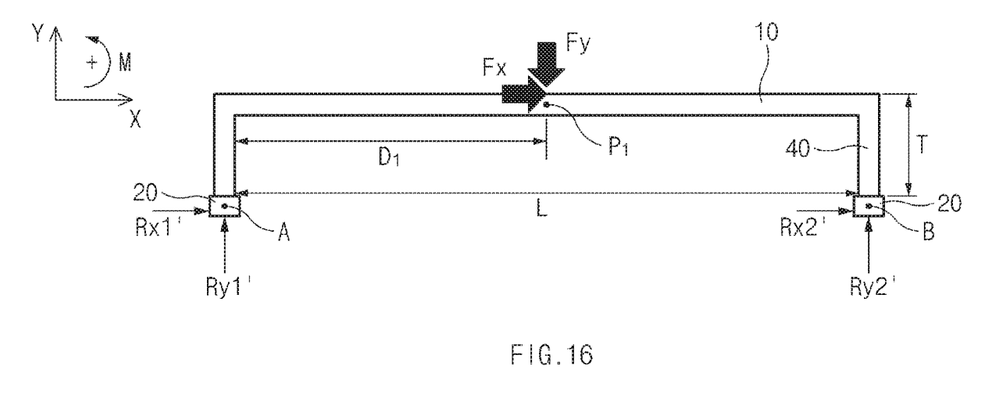
FIG. 16 illustrates an equivalent free body diagram of FIG. 15, by dividing the force of FIG. 15 into a vertical load and a horizontal load.

FIG. 16 illustrates an equivalent free body diagram of FIG. 15, by dividing the force F of FIG. 15 into a vertical load Fy and a horizontal load Fx.

Figure 17:
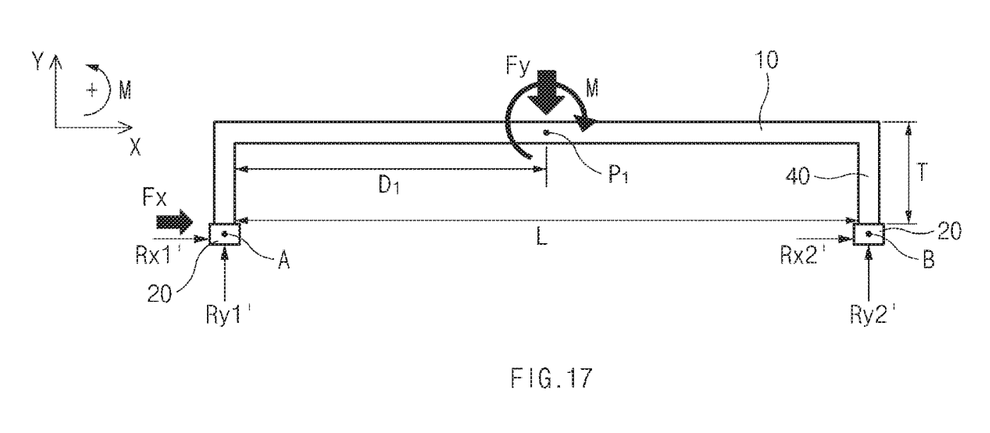
FIG. 17 illustrates an equivalent free body diagram of FIG. 16, by allowing the vertical load of FIG. 16 to be equal to a moment M at point $D_1$.

FIG. 17 illustrates an equivalent free body diagram of FIG. 16, by allowing the horizontal load Fx of FIG. 16 to be equal to a moment M at point $D_1$.

Figure 18:
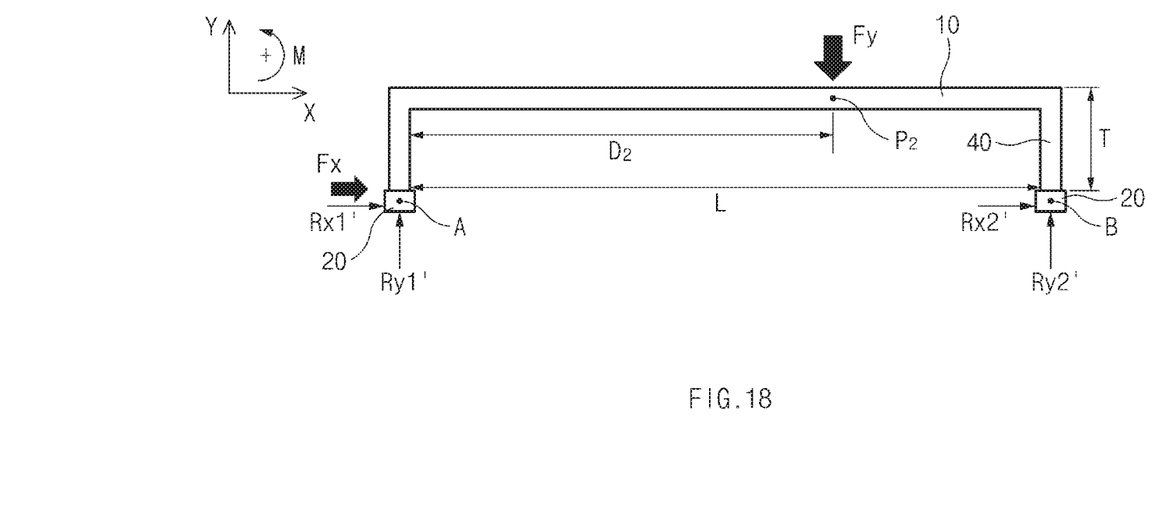
FIG. 18 illustrates an equivalent free body diagram of FIG. 17, in which a point of application of the vertical load is moved to point $D_2$ by the moment M of FIG. 17.

FIG. 18 illustrates an equivalent free body diagram of FIG. 17, in which a point of application of the vertical load Fy is moved to point $D_2$ by the moment M of FIG. 17.

As illustrated in FIGS. 15 to 18, when the vertical load Fy and the horizontal load Fx are applied to the first position $P_1$, a vertical reaction force Ry1' and a horizontal reaction force Rx1' may act on point A to which one second sensor 20 is fixed, and a vertical reaction force Ry2' and a horizontal reaction force Rx2' may act on point B to which the other second sensor 20 is fixed. Here, the vertical reaction forces Ry1' and Ry2' may be assumed to have positive values on the Y-axis of the coordinate system, and the horizontal reaction forces Rx1' and Rx2' may be assumed to have positive values on the X-axis of the coordinate system.

In FIG. 16, an equilibrium equation for the moment at point A may be $\Sigma M_A = -D_1 Fy - TFx + L Ry2' = 0$, and the following equation 3 may be derived therefrom:

$$Ry2' = \frac{D_1}{L}Fy + \frac{T}{L}Fx \qquad \text{[Equation 3]}$$

In FIG. 16, an equilibrium equation for the force acting in the horizontal direction may be $\Sigma F_x = Rx1' + Rx2' + Fx = 0$.

In FIG. 16, an equilibrium equation for the force acting in the vertical direction may be $\Sigma F_Y = Ry1' + Ry2' - Fy = 0$, and the following equation 4 may be derived by applying equation 3 thereto:

$$Ry1' = \left(1 - \frac{D_1}{L}\right)Fy - \frac{D_1}{L}Fx \qquad \text{[Equation 4]}$$

Meanwhile, the following equation 5 may be derived by applying equation 1 to equation 4:

$$Ry1' = Ry1 - \frac{T}{L}Fx \qquad \text{[Equation 5]}$$

In addition, the following equation 6 may be derived by applying equation 2 to equation 3:

$$Ry2' = Ry2 + \frac{T}{L}Fx \qquad \text{[Equation 6]}$$

Based on equations 5 and 6, it can be seen that when the vertical load Fy and the horizontal load Fx are applied, compared to when the vertical load Fy is only applied, the vertical reaction forces Ry1' and Ry2' may be increased or reduced by the influence of the horizontal load Fx and the moment due to the vertical gap T.

In FIG. 18, an equilibrium equation for the moment at point A may be $\Sigma M_A = -D_2 Fy + LRy2' = 0$, and the following equation 7 may be derived by applying Fy=Ry1'+Ry2' thereto:

$$D_2 = \frac{LRy2'}{Fy} = \frac{LRy2'}{Ry1' + Ry2'} \qquad \text{[Equation 7]}$$

Here, the vertical reaction forces Ry1' and Ry2' may be measured by the second sensor 20, and since L is a known value, $D_2$ may easily be calculated.

The following equation 8 may be derived by applying equations 3 and 2 to equation 7:

$$D_2 = \frac{LRy2 + TFx}{Fy} = D_1 + T\frac{Fx}{Fy} = D_1 + T\tan\theta \qquad \text{[Equation 8]}$$

The horizontal distance $D_2$ with respect to the second position $P_2$ calculated by the second sensor 20 on the basis of equation 8 may be affected by the horizontal distance $D_1$ with respect to the first position $P_1$ measured by the first sensor 10, the vertical gap T between the first sensor 10 and the second sensor 20, the inclined angle θ of the force applied by the touch, and the like.

When $D_2$ is calculated through the aforementioned force and moment equilibrium equations and the vertical reaction forces Ry1' and Ry2' measured by the second sensor 20, a difference between $D_2$ and $D_1$ may be calculated as the distance D ($D=D_2-D_1$) between the first position $P_1$ and the second position $P_2$) due to the shear force.

In addition, as can be seen in equations 7 and 8, the distance D may be expressed as a function involving the vertical gap T between the first sensor 10 and the second sensor 20 as a variable.

The touch input to the first surface 11 may be determined as a shear force S or a sliding gesture on the basis of a threshold function involving the distance D and various errors as variables. For example, when the distance D is greater than the threshold function, the touch input to the first surface 11 may be determined as the shear force S, and when the distance D is less than the threshold function, the touch input to the first surface 11 may be determined as the sliding gesture.

As described above, the first sensor 10 and the second sensor 20 may be spaced apart from each other in the vertical direction, and thus, when the touch is input to the first sensor 10, the shear force may easily be generated. In addition, since the distance difference due to the shear force is accurately calculated using the force measured by the second sensor 20, the accurate sensing of the shear force may be facilitated.

The second sensor 20 may be a force sensor capable of measuring a vertical load with respect to a touch input to the first sensor 10.

According to another exemplary embodiment, the second sensor 20 may also be a strain gauge capable of measuring a force as the strain gauge is subjected to bending by a touch input to the first sensor 10.

When the second sensor 20 is provided as the strain gauge, an elastic member 30 may be interposed between the second sensor 20 and the first sensor 10 in order to stably detect deformation caused by the touch applied to the first sensor 10.

The elastic member 30 may be connected to the second surface 12 of the first sensor 10, and the elastic member 30 may be deformed by the touch applied to the first sensor 10 in the vertical direction to thereby transfer a force caused by the touch to the second sensor 20.

Figure 2:
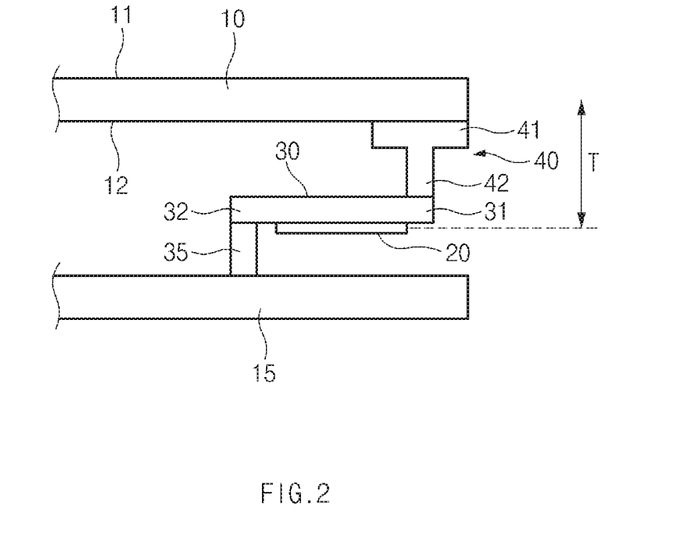
FIG. 2 illustrates an enlarged view of a portion of the touch input device indicated by letter A of FIG. 1.

Referring to FIG. 2, a structure in which the second sensor 20 is provided with the elastic member 30 will be detailed below.

As illustrated in FIG. 2, one end 31 of the elastic member 30 may be connected to the second surface 12 of the first sensor 10 through a connecting member 40, and another end 32 of the elastic member 30 may be fixed to a support member 35 to be supported thereby.

The connecting member 40 may be disposed to protrude from the second surface 12 of the first sensor 10 in a downward direction (i.e., toward the base plate 15), and the support member 35 may be disposed to protrude from the base plate 15 in an upward direction (i.e., toward the first sensor 10). The connecting member 40 and the support member 35 may be spaced apart from each other in the horizontal direction.

In particular, one end 31 of the elastic member 30 may be fixed to the bottom of the connecting member 40 using an adhesive or the like, such that it may be connected to the second surface 12 of the first sensor 10, and the other end 32 of the elastic member 30 may be fixed to the top of the support member 35 using an adhesive or the like, such that it may be connected to the base plate 15.

When a touch is applied to one point on the first surface 11 of the first sensor 10, the elastic member 30 may have a cantilever behavior in which one end 31 of the elastic member 30 is deformed in the vertical direction in relation to the other end 32 of the elastic member 30. In other words, the elastic member 30 may be a cantilever structure connected to the second surface 12 of the first sensor 10, and the cantilever behavior of the elastic member 30 may enable the bending of the second sensor 20 stably and smoothly.

As the connecting member 40 protrudes from the second surface 12 of the first sensor 10 in the downward direction and the elastic member 30 is connected to the connecting member 40, the second sensor 20 may be spaced apart from the first sensor 10 by a predetermined gap T in the vertical direction, and thus, the force caused by the touch may be easily transferred to the elastic member 30 such that the elastic member 30 may be stably deformed.

According to the exemplary embodiment of FIG. 2, the connecting member 40 may have a T-shaped structure including a horizontal portion 41 extending in the horizontal direction and a vertical portion 42 extending from the center of the horizontal portion 41 in the vertical direction. The top of the horizontal portion 41 may be fixed to the second surface 12 of the first sensor 10 using an adhesive or the like, and the bottom of the vertical portion 42 may be fixed to one end 31 of the elastic member 30 using an adhesive or the like. Throughout this disclosure, while adhesives are often mentioned as means for joining two elements, it is to be understood that various mechanical fasteners may also be used to join the two elements.

FIGS. 3 to 7 illustrate modified structures of the connecting member 40 and the elastic member 30 of FIG. 2, according to other exemplary embodiments of the present disclosure.

Figure 3:
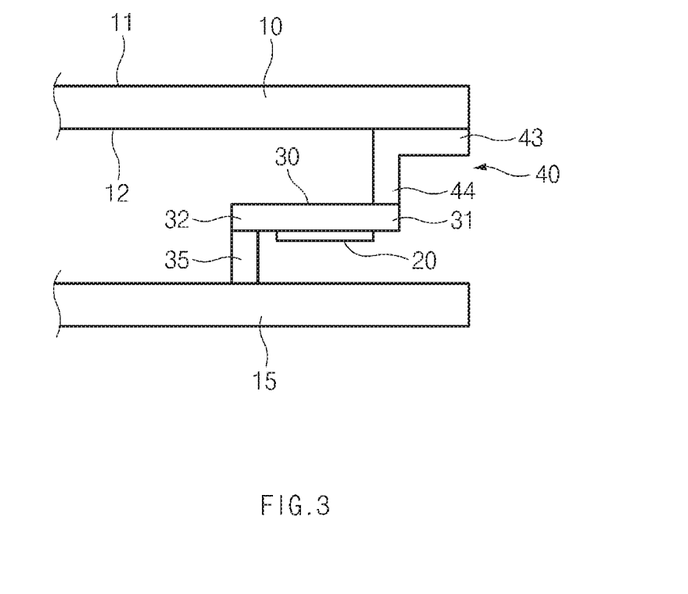
FIG. 3 illustrates a modified structure of the touch input device of FIG. 2 according to another exemplary embodiment of the present disclosure.

According to the exemplary embodiment of FIG. 3, the connecting member 40 may have a reverse L-shaped structure including a horizontal portion 43 extending in the horizontal direction and a vertical portion 44 extending from one end of the horizontal portion 43 in the vertical direction. The top of the horizontal portion 43 may be fixed to the second surface 12 of the first sensor 10 using an adhesive or the like, and the bottom of the vertical portion 44 may be fixed to one end 31 of the elastic member 30 using an adhesive or the like. The vertical portion 44 may be disposed to be inwardly spaced apart from an edge of the first sensor 10, and thus, the elastic member 30 and the second sensor 20 may be disposed to be inwardly spaced apart from the edge of the first sensor 10.

Figure 4:
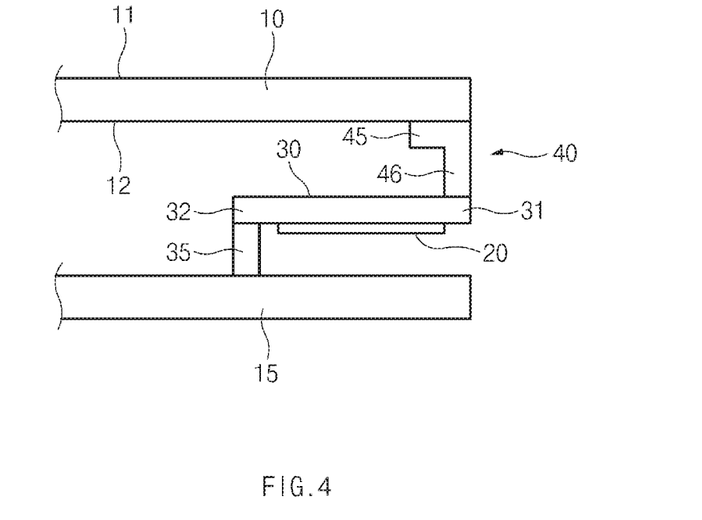
FIG. 4 illustrates a modified structure of the touch input device of FIG. 2 according to another exemplary embodiment of the present disclosure.

According to the exemplary embodiment of FIG. 4, the connecting member 40 may have a reverse L-shaped structure including a horizontal portion 45 extending in the horizontal direction and a vertical portion 46 extending from one end of the horizontal portion 45 in the vertical direction. The horizontal portion 45 of the connecting member 40 in FIG. 4 and the horizontal portion 43 of the connecting member 40 in FIG. 3 may extend in opposite directions. The top of the horizontal portion 45 may be fixed to the second surface 12 of the first sensor 10 using an adhesive or the like, and the bottom of the vertical portion 46 may be fixed to one end 31 of the elastic member 30 using an adhesive or the like. The vertical portion 46 may be disposed on the same vertical line with the edge of the first sensor 10, and thus, the elastic member 30 may be disposed to be adjacent to the edge of the first sensor 10.

Figure 5:
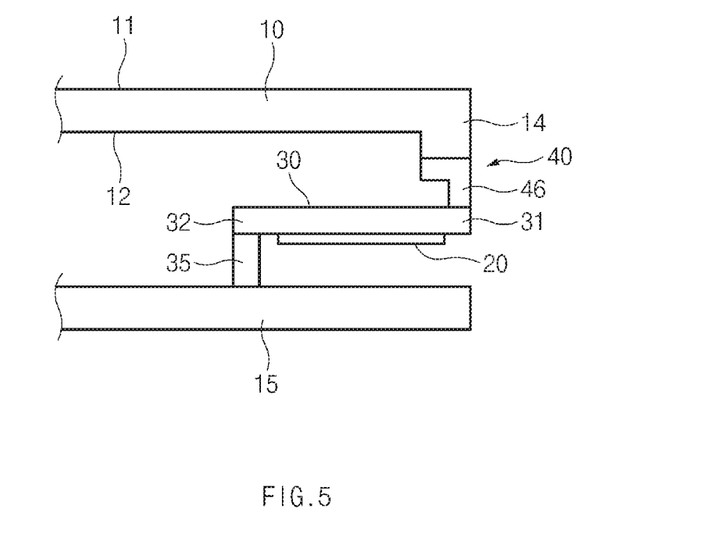
FIG. 5 illustrates a modified structure of the touch input device of FIG. 2 according to another exemplary embodiment of the present disclosure.

According to the exemplary embodiment of FIG. 5, a protrusion 14 may protrude from the second surface 12 of the first sensor 10 in the downward direction, and the connecting member 40 may have a reverse L-shaped structure including the horizontal portion 45 extending in the horizontal direction and the vertical portion 46 extending from one end of the horizontal portion 45 in the vertical direction. The top of the horizontal portion 45 may be fixed to the protrusion 14 using an adhesive or the like, and the bottom of the vertical portion 46 may be fixed to one end 31 of the elastic member 30 using an adhesive or the like.

Figure 6:
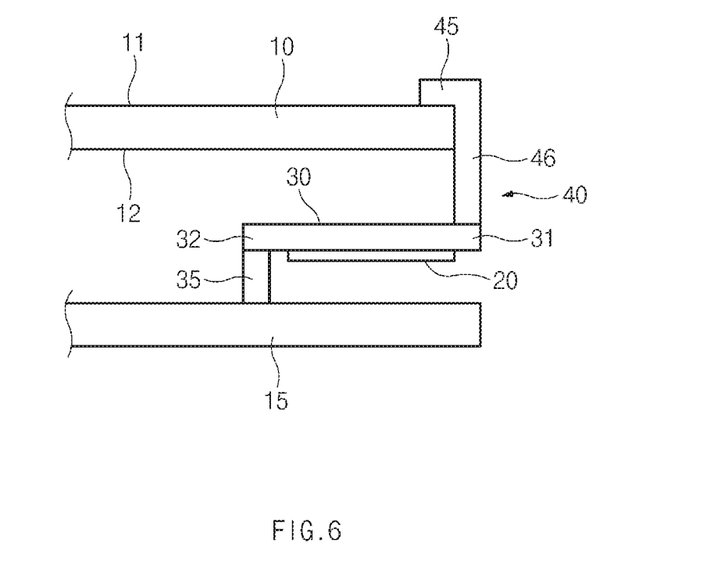
FIG. 6 illustrates a modified structure of the touch input device of FIG. 2 according to another exemplary embodiment of the present disclosure.

According to the exemplary embodiment of FIG. 6, the connecting member 40 may have a reverse L-shaped structure including the horizontal portion 45 extending in the horizontal direction and the vertical portion 46 extending from one end of the horizontal portion 45 in the vertical direction. An intersecting portion of the horizontal portion 45 and the vertical portion 46 may be fixed to the edge of the first sensor 10 using an adhesive or the like, and the bottom of the vertical portion 46 may be fixed to one end 31 of the elastic member 30 using an adhesive or the like.

Figure 7:
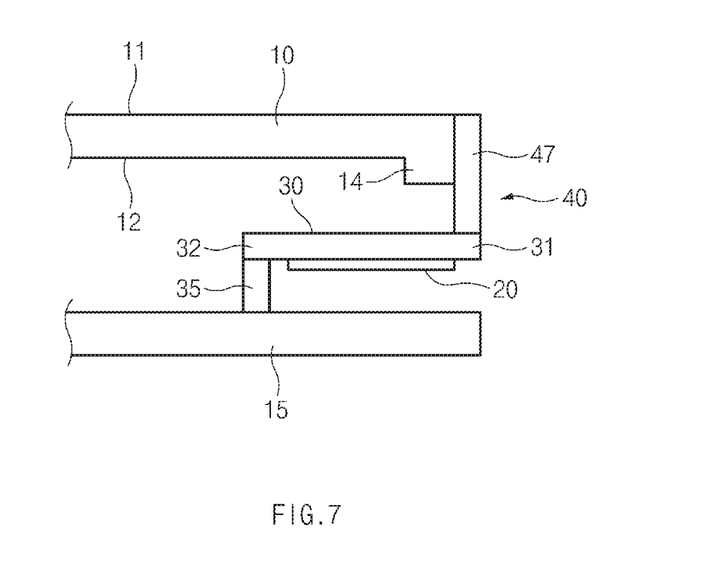
FIG. 7 illustrates a modified structure of the touch input device of FIG. 2 according to another exemplary embodiment of the present disclosure.

According to the exemplary embodiment of FIG. 7, the connecting member 40 includes a bar 47 extending in the vertical direction. An upper portion of the bar 47 may be fixed to the edge of the first sensor 10 using an adhesive or the like, and the bottom of the bar 47 may be fixed to one end 31 of the elastic member 30 using an adhesive or the like.

According to other exemplary embodiments, a second sensor 25 may be a force sensor of various structures capable of measuring a vertical load, other than a strain gauge.

Since the elastic member 30 is not connected to the second sensor 25, the second sensor 25 may be directly connected to the connecting member 40. The second sensor 25 may be connected to the second surface 12 of the first sensor 10 through only the connecting member 40, and the vertical load caused by the touch applied to the first sensor 10 may be directly transferred to the second sensor 25 through the connecting member 40.

Modified structures in which the second sensor 25 is connected to the first sensor 10 through the connecting member 40 will be detailed with reference to FIGS. 8 to 13.

Figure 8:
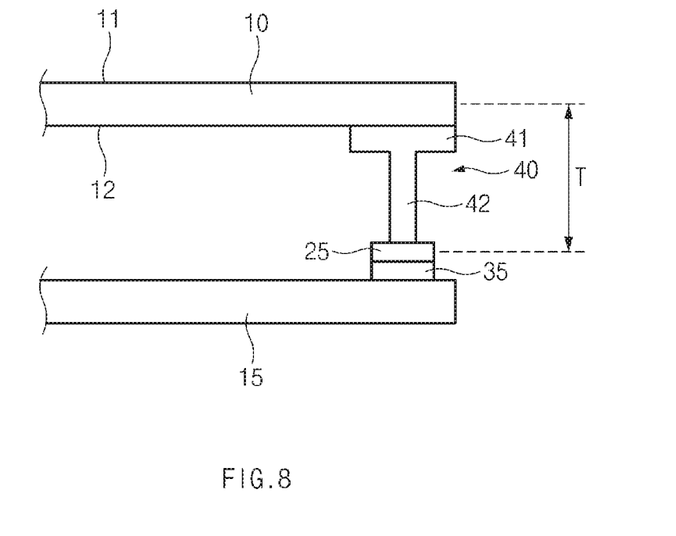
FIG. 8 illustrates a modified structure of the touch input device of FIG. 2 according to another exemplary embodiment of the present disclosure.

According to the exemplary embodiment of FIG. 8, the connecting member 40 may have a T-shaped structure including the horizontal portion 41 extending in the horizontal direction and the vertical portion 42 extending from the center of the horizontal portion 41 in the vertical direction. The top of the horizontal portion 41 may be fixed to the second surface 12 of the first sensor 10 using an adhesive or the like, and the bottom of the vertical portion 42 may be fixed to a top surface of the second sensor 25 using an adhesive or the like.

Figure 9:
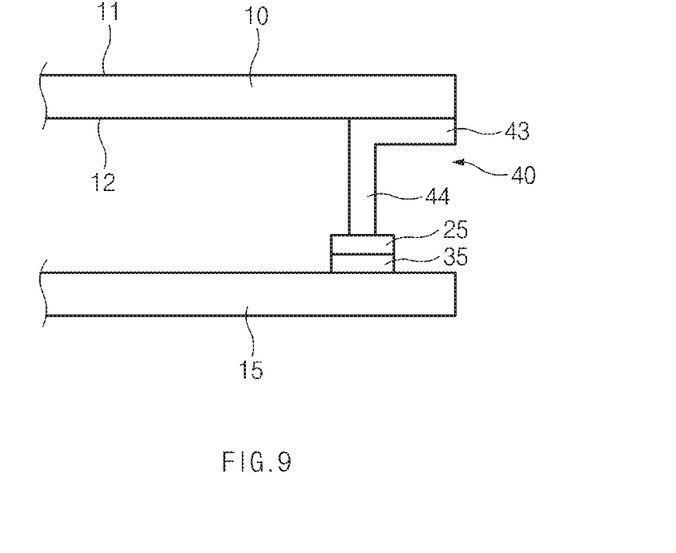
FIG. 9 illustrates a modified structure of the touch input device of FIG. 2 according to another exemplary embodiment of the present disclosure.

According to the exemplary embodiment of FIG. 9, the connecting member 40 may have a reverse L-shaped structure including the horizontal portion 43 extending in the horizontal direction and the vertical portion 44 extending from one end of the horizontal portion 43 in the vertical direction. The top of the horizontal portion 43 may be fixed to the second surface 12 of the first sensor 10 using an adhesive or the like, and the bottom of the vertical portion 44 may be fixed to the top surface of the second sensor 25 using an adhesive or the like. The vertical portion 42 may be disposed to be inwardly spaced apart from the edge of the first sensor 10, and thus, the second sensor 25 may be disposed to be inwardly spaced apart from the edge of the first sensor 10.

Figure 10:
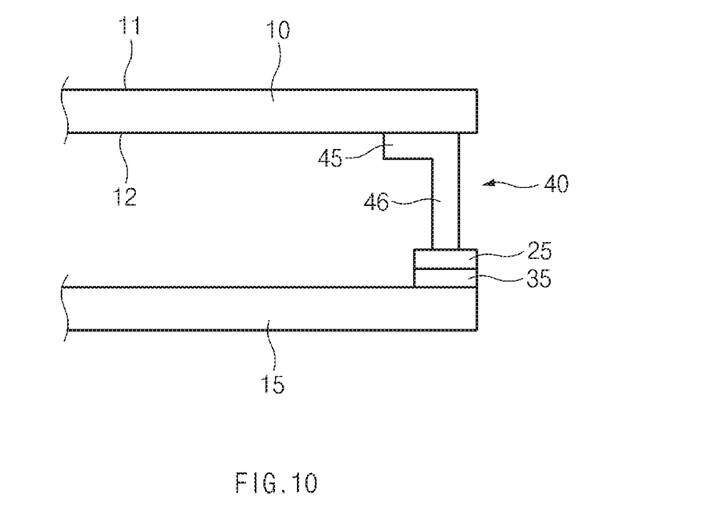
FIG. 10 illustrates a modified structure of the touch input device of FIG. 2 according to another exemplary embodiment of the present disclosure.

According to the exemplary embodiment of FIG. 10, the connecting member 40 may have a reverse L-shaped structure including the horizontal portion 45 extending in the horizontal direction and the vertical portion 46 extending from one end of the horizontal portion 45 in the vertical direction. The horizontal portion 45 of the connecting member 40 in FIG. 10 and the horizontal portion 43 of the connecting member 40 in FIG. 9 may extend in opposite directions. The top of the horizontal portion 45 may be fixed to the second surface 12 of the first sensor 10 using an adhesive or the like, and the bottom of the vertical portion 46 may be fixed to the top surface of the second sensor 25 using an adhesive or the like. The vertical portion 46 may be disposed to be disposed to adjacent to the edge of the first sensor 10, and thus, the second sensor 25 may be disposed to be adjacent to the edge of the first sensor 10.

Figure 11:
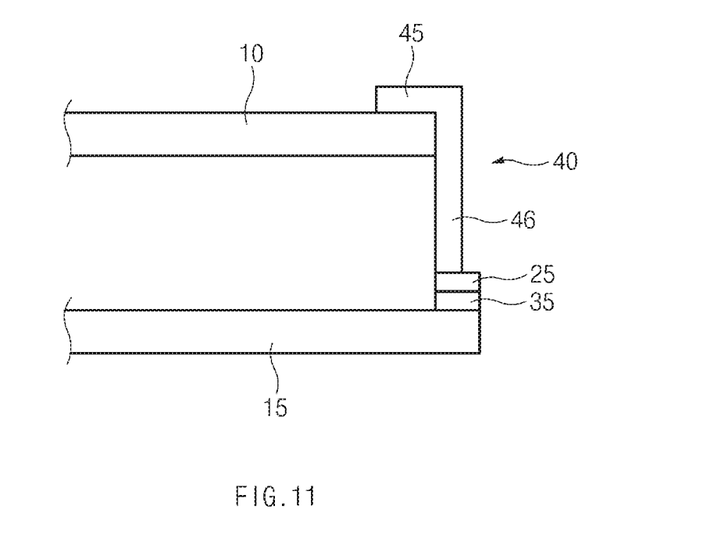
FIG. 11 illustrates a modified structure of the touch input device of FIG. 2 according to another exemplary embodiment of the present disclosure.

According to the exemplary embodiment of FIG. 11, the connecting member 40 may have a reverse L-shaped structure including the horizontal portion 45 extending in the horizontal direction and the vertical portion 46 extending from one end of the horizontal portion 45 in the vertical direction. An intersecting portion of the horizontal portion 45 and the vertical portion 46 may be fixed to the edge of the first sensor 10 using an adhesive or the like, and the bottom of the vertical portion 46 may be fixed to the top surface of the second sensor 25 using an adhesive or the like.

Figure 12:
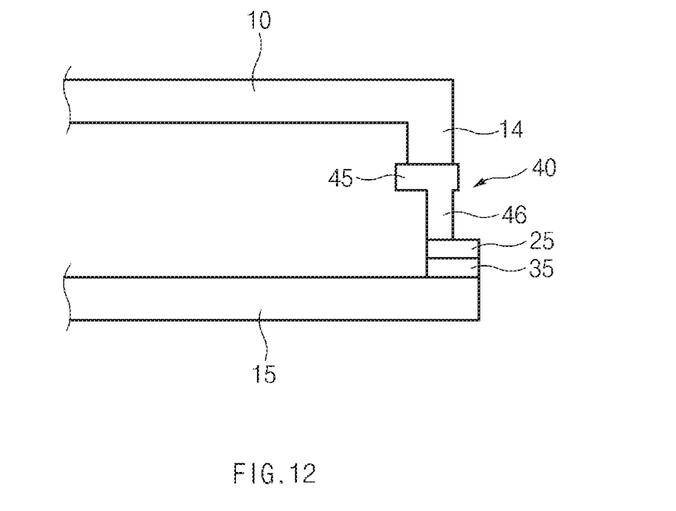
FIG. 12 illustrates a modified structure of the touch input device of FIG. 2 according to another exemplary embodiment of the present disclosure.

According to the exemplary embodiment of FIG. 12, the protrusion 14 may protrude from the second surface 12 of the first sensor 10 in the downward direction, and the connecting member 40 may have a reverse L-shaped structure including the horizontal portion 45 extending in the horizontal direction and the vertical portion 46 extending from one end of the horizontal portion 45 in the vertical direction. The top of the horizontal portion 45 may be fixed to the protrusion 14 using an adhesive or the like, and the bottom of the vertical portion 46 may be fixed to the top surface of the second sensor 25 using an adhesive or the like.

Figure 13:
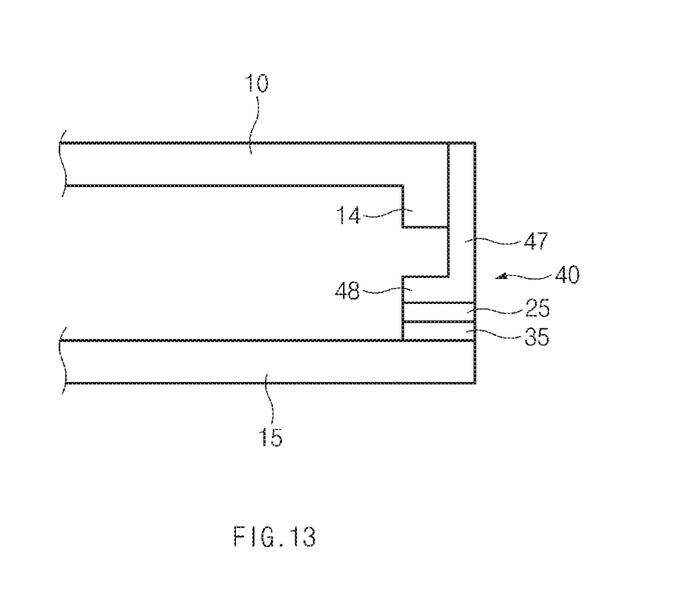
FIG. 13 illustrates a modified structure of the touch input device of FIG. 2 according to another exemplary embodiment of the present disclosure.

According to the exemplary embodiment of FIG. 13, the protrusion 14 may protrude from the edge of the first sensor 10 in the downward direction, and the connecting member 40 may have an L-shaped structure including a vertical portion 48 extending in the vertical direction and a horizontal portion 49 extending from the bottom of the vertical portion 48 in the horizontal direction. An upper portion of the vertical portion 48 may be fixed to the edge of the first sensor 10 and a side of the protrusion 14 using an adhesive or the like, and the bottom of the horizontal portion 49 may be fixed to the top surface of the second sensor 25 using an adhesive or the like.

Meanwhile, the second sensor 20 or 25 may be disposed to be adjacent to the edge of the first sensor 10, or may be disposed to be inwardly spaced apart from the edge of the first sensor 10.

As set forth above, according to the exemplary embodiments, the touch input device may facilitate shear force generation and shear force sensing to thereby provide enhanced touch interactions.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A touch input device, comprising:
a first sensor having a first surface to which a touch is input, and a second surface opposing the first surface; and
a second sensor connected to the second surface of the first sensor for measuring a force caused by the touch input to the first surface, and spaced apart from the first sensor in a vertical direction,
wherein the first sensor measures a first position of the touch input to the first surface,
wherein the second sensor measures the force caused by the touch input to the first surface of the first sensor, and calculates a second position by applying the force measured by the second sensor to force and moment equilibrium equations,
wherein the second sensor is a force sensor capable of measuring a vertical load caused by the tough input to the first sensor,
wherein the second sensor is spaced apart from the first sensor through a connecting member in the vertical direction, and
wherein the connecting member, which separates the first and second sensors, is disposed at a peripheral area of the second surface of the first sensor, and a space below a central area of the second surface of the first sensor is an empty space.

2. The touch input device according to claim 1, wherein the first sensor is at least one of a touch panel, a touch pad and a touch screen.

3. The touch input device according to claim 1, wherein the connecting member is disposed to protrude from the second surface of the first sensor in a downward direction.

4. The touch input device according to claim 3, further comprising a base plate spaced apart from the second surface of the first sensor,
wherein the second sensor is disposed above the base plate to be supported by a support member.

5. The touch input device according to claim 4, wherein the support member is disposed to protrude from the base plate toward the first sensor.

6. The touch input device according to claim 5, wherein the connecting member includes a T-shaped structure including a horizontal portion extending in a horizontal direction and a vertical portion extending from a center of the horizontal portion in the vertical direction, and
the horizontal portion is connected to the first sensor, and the vertical portion is connected to the second sensor.

7. The touch input device according to claim 5, wherein the connecting member includes a reverse L-shaped structure including a horizontal portion extending in a horizontal direction and a vertical portion extending from one end of the horizontal portion in the vertical direction, and
the horizontal portion is connected to the first sensor, and the vertical portion is connected to the second sensor.

8. The touch input device according to claim 5, wherein the connecting member includes a reverse L-shaped structure including a horizontal portion extending in a horizontal direction and a vertical portion extending from one end of the horizontal portion in the vertical direction, and
an intersecting portion of the horizontal portion and the vertical portion is fixed to an edge of the first sensor, and a bottom of the vertical portion is connected to the second sensor.

9. The touch input device according to claim 5, wherein the connecting member includes a reverse L-shaped structure including a horizontal portion extending in a horizontal direction and a vertical portion extending from one end of the horizontal portion in the vertical direction,
a protrusion protrudes from the second surface of the first sensor in the downward direction, and
the horizontal portion is fixed to the protrusion, and the vertical portion is connected to the second sensor.

10. The touch input device according to claim 5, wherein the connecting member includes an L-shaped structure including a vertical portion extending in the vertical direction and a horizontal portion extending from a bottom of the vertical portion in a horizontal direction, and
an upper portion of the vertical portion is fixed to an edge of the first sensor, and a bottom of the horizontal portion is connected to the second sensor.

11. The touch input device according to claim 1, wherein the second sensor is a strain gauge for measuring a force as the strain gauge is subjected to bending by the touch input to the first sensor.

12. The touch input device according to claim 11, wherein the second sensor is connected to the second surface of the first sensor via an elastic member.

13. The touch input device according to claim 12, wherein the elastic member is a cantilever structure connected to the second surface of the first sensor.

14. The touch input device according to claim 13, wherein one end of the elastic member is connected to the second surface of the first sensor through a connecting member, and another end of the elastic member is supported by a support member.

15. The touch input device according to claim 1, wherein when a distance between the first position and the second position is greater than a threshold, the touch input to the first surface of the first sensor is determined to be a shear force, and
    when the distance between the first position and the second position is less than the threshold, the touch input to the first surface of the first sensor is determined to be a sliding gesture.

\* \* \* \* \*